No. 681,949. Patented Sept. 3, 1901.
J. & J. A. BUTKUS.
BOTTLE STOPPERING MACHINE.
(Application filed Mar. 9, 1901.)
(No Model.) 6 Sheets—Sheet 1.
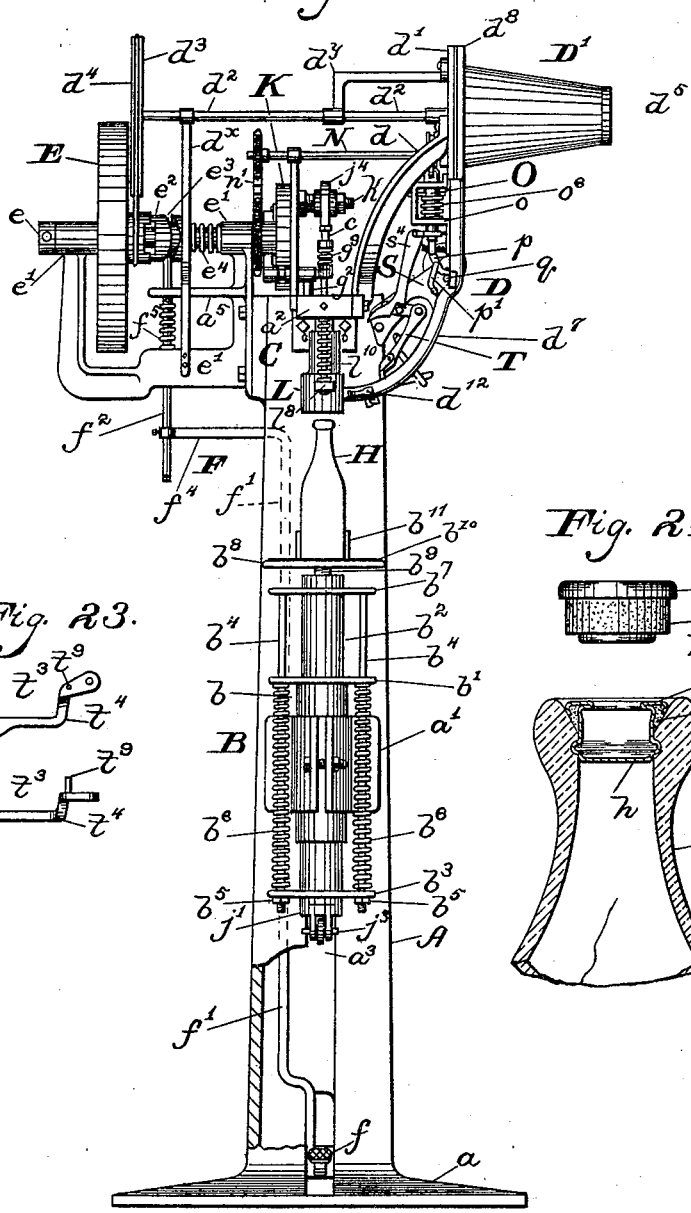

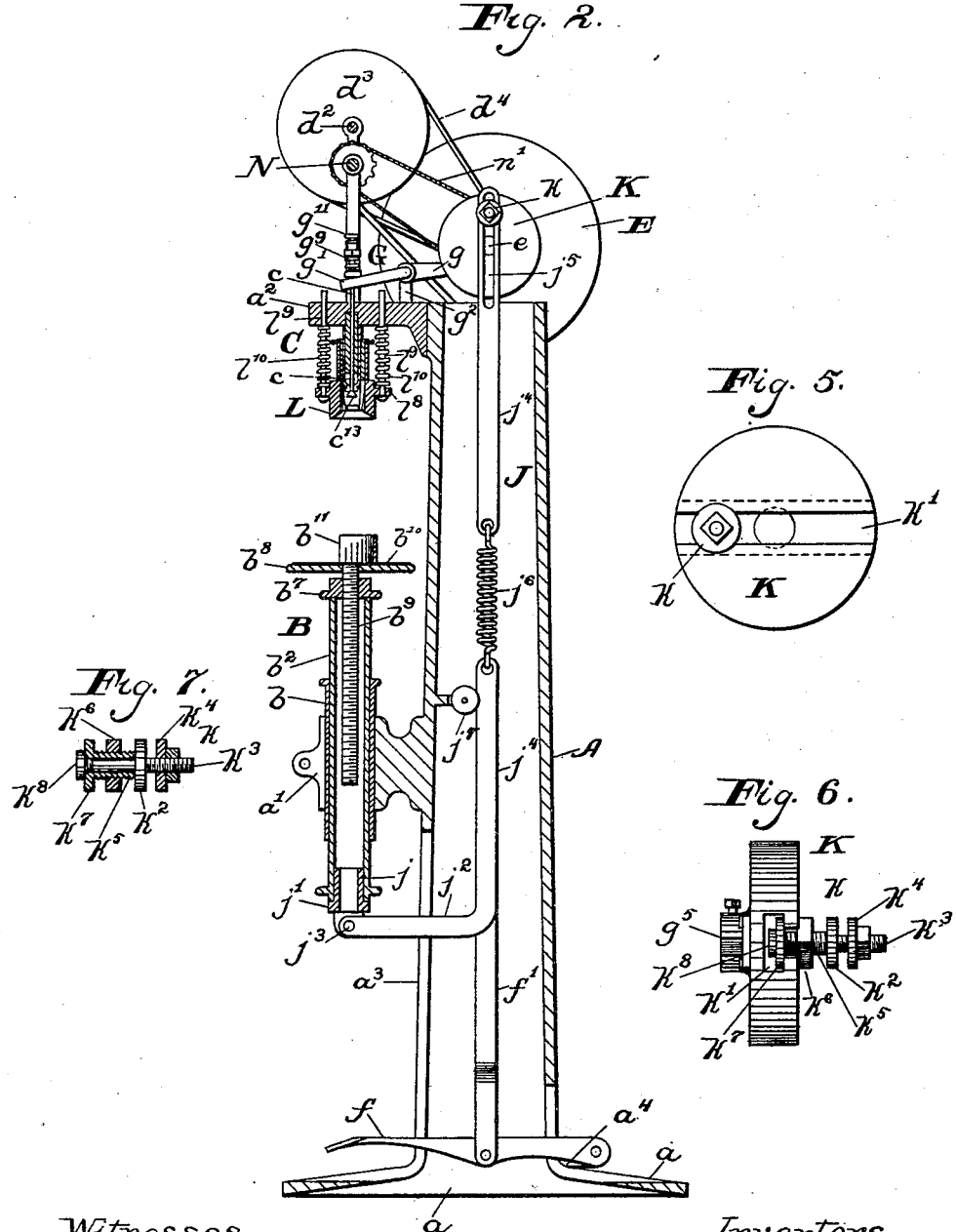

No. 681,949. Patented Sept. 3, 1901.
J. & J. A. BUTKUS.
BOTTLE STOPPERING MACHINE.
(Application filed Mar. 9, 1901.)
(No Model.) 6 Sheets—Sheet 3.
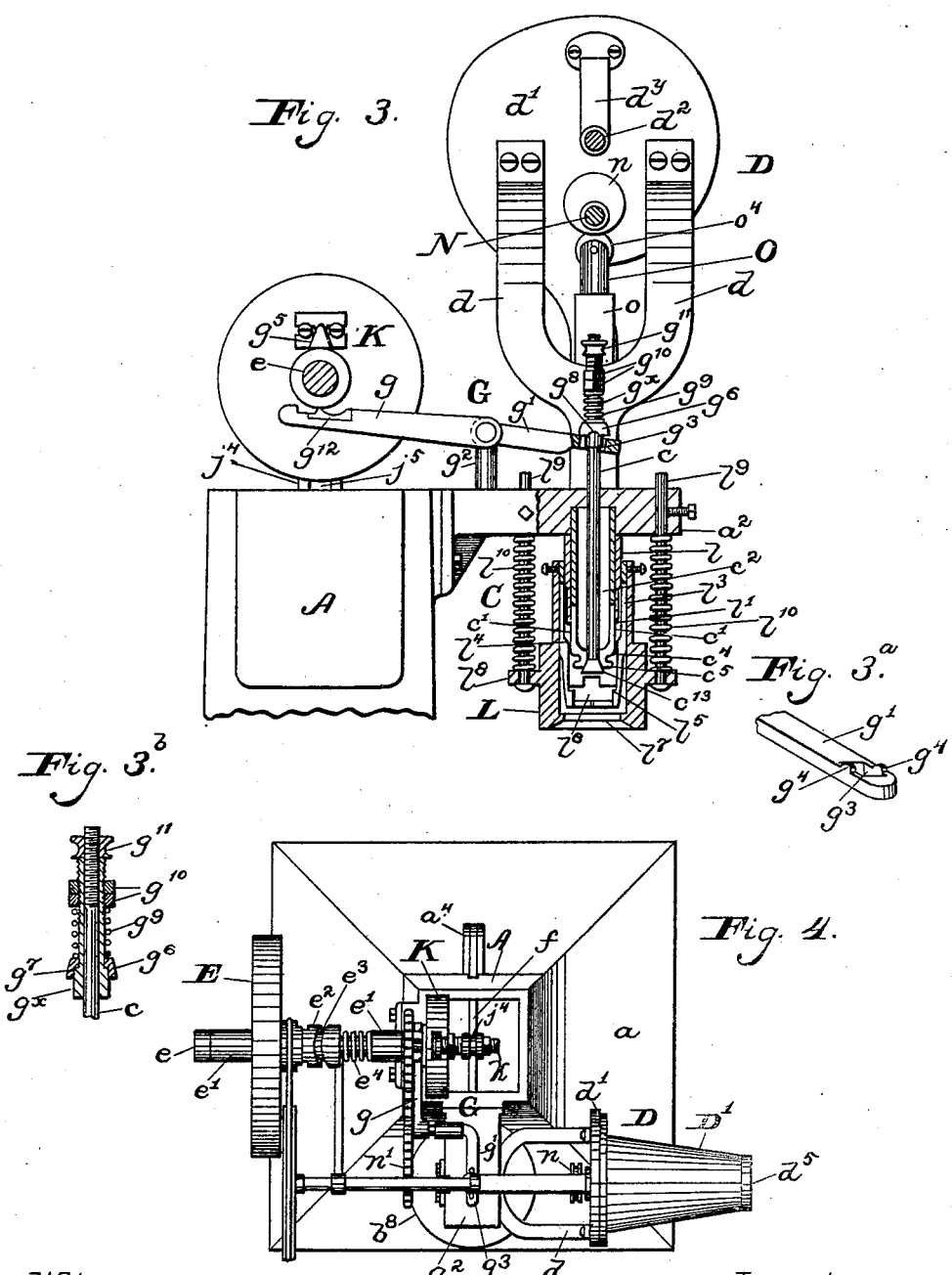

No. 681,949. Patented Sept. 3, 1901.
J. & J. A. BUTKUS.
BOTTLE STOPPERING MACHINE.
(Application filed Mar. 9, 1901.)
(No Model.) 6 Sheets—Sheet 4.
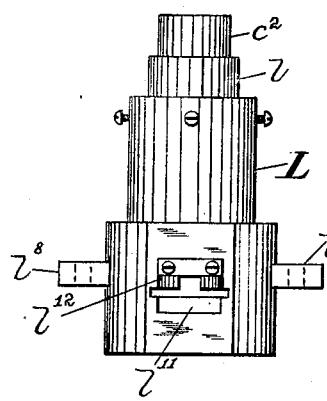
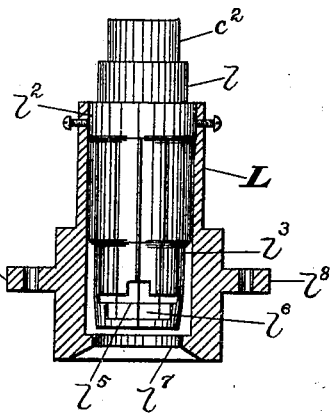
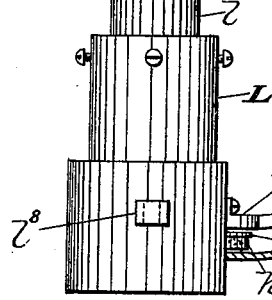
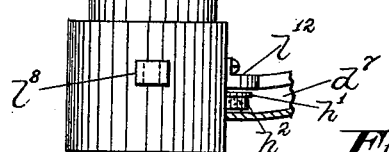
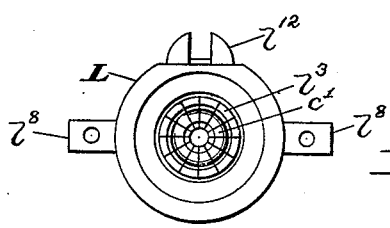
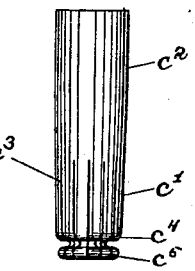
Witnesses.
H. F. Meyer Jr.
F. S. Stitt.
Inventors.
Joseph Butkus
John A. Butkus
By Chas. B. Mann
Attorney.

No. 681,949. Patented Sept. 3, 1901.
J. & J. A. BUTKUS.
BOTTLE STOPPERING MACHINE.
(Application filed Mar. 9, 1901.)
(No Model.) 6 Sheets—Sheet 5.
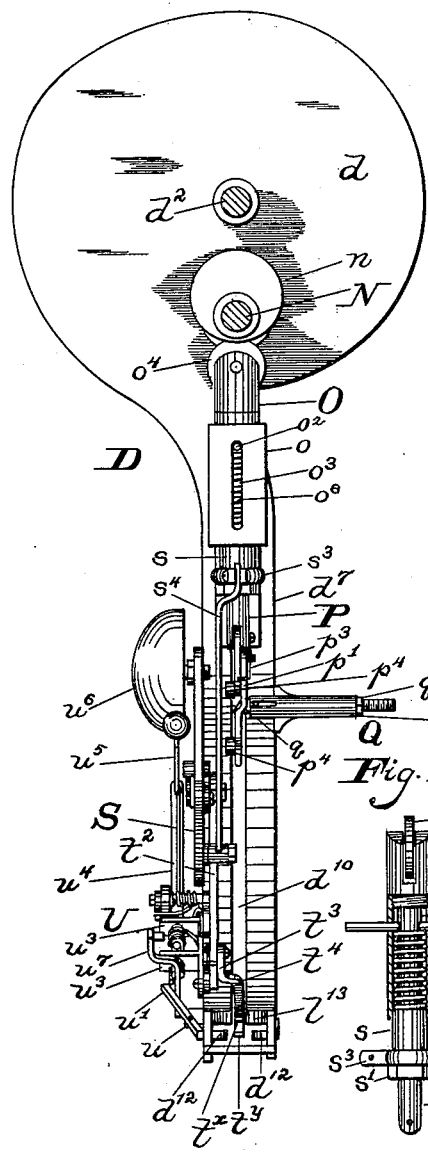
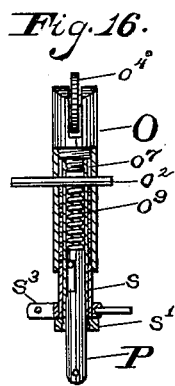
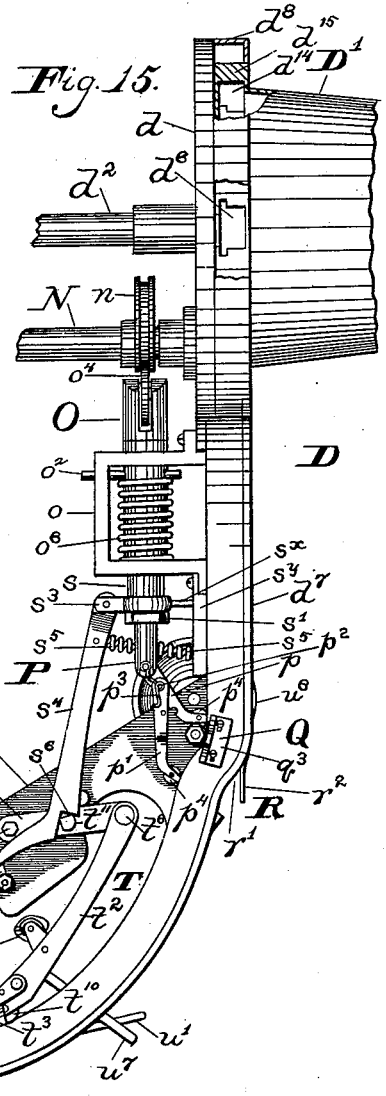
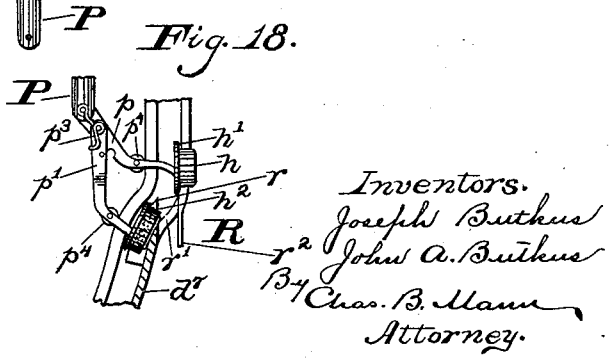
Witnesses.
H. F. Meyer Jr.
F. S. Stitt.
Inventors.
Joseph Butkus
John A. Butkus
By Chas. B. Mann
Attorney.
THE NORRIS PETERS CO., PHOTO-LITHO., WASHINGTON, D. C.

No. 681,949. Patented Sept. 3, 1901.
J. & J. A. BUTKUS.
BOTTLE STOPPERING MACHINE.
(Application filed Mar. 9, 1901.)
(No Model.) 6 Sheets—Sheet 6.
Fig. 19.
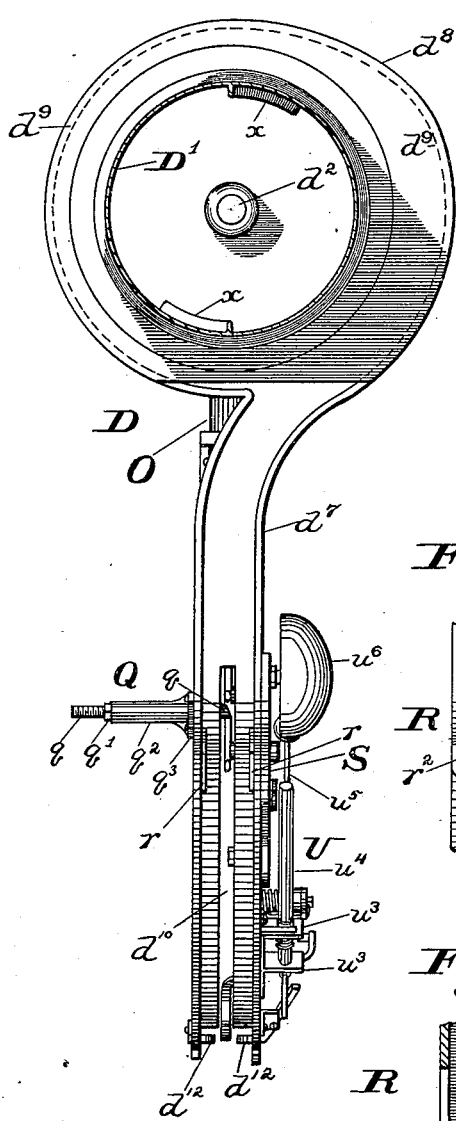
Fig. 20.
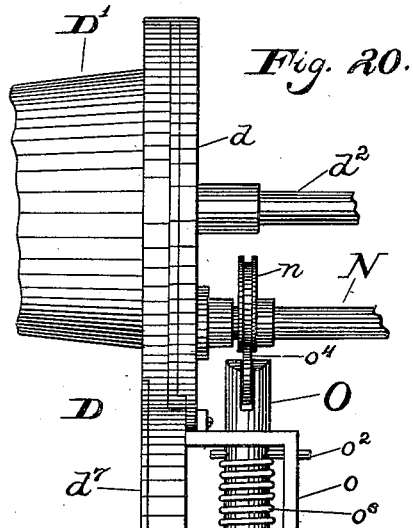
Fig. 21.
Fig. 22.
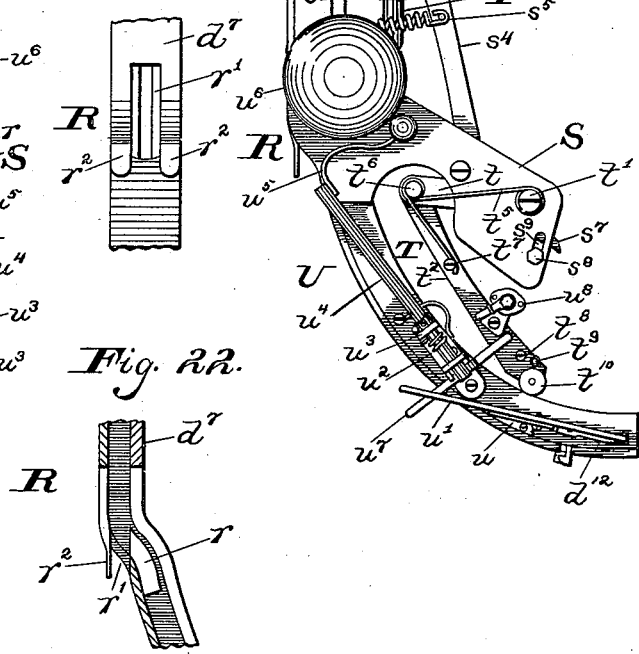
Witnesses.
H. F. Meyer, Jr.
F. S. Stitt.
Inventors.
Joseph Butkus
John A. Butkus
By Chas. B. Mann
Attorney.

UNITED STATES PATENT OFFICE.

JOSEPH BUTKUS AND JOHN A. BUTKUS, OF BALTIMORE, MARYLAND.

BOTTLE-STOPPERING MACHINE.

SPECIFICATION forming part of Letters Patent No. 681,949, dated September 3, 1901.

Application filed March 9, 1901. Serial No. 50,436. (No model.)

*To all whom it may concern:*

Be it known that we, JOSEPH BUTKUS and JOHN A. BUTKUS, citizens of the United States, residing at Baltimore, in the State of Maryland, have invented certain new and useful Improvements in Bottle-Stoppering Machines, of which the following is a specification.

This invention relates to machines for inserting and fastening stoppers in bottles; and one of its objects is to provide a machine of this character which will fasten a cup-shaped ductile metallic stopper in a bottle-neck by first forcing the stopper to its seat and then expanding the side walls thereof into an interior annular groove or under an annular shoulder formed in the bottle-neck just below the upper edge of the same. In placing the stopper in position the sealing collar of cork or other material is compressed, and then the side walls of the metal stopper are expanded.

A further object of the invention is to provide feed devices in combination with the stoppering-machine which will positively feed the stoppers one at a time into position to be acted upon by the stoppering mechanism.

Reference is to be had to the accompanying drawings, in which—

Figure 1 is a front elevation of our improved bottle-stoppering machine. Fig. 2 is vertical transverse section thereof, taken at right angles to Fig. 1. Fig. 3 is an enlarged vertical section of the upper part of the machine looking toward the right of the machine as shown in Fig. 1. Fig. 3ª is a detail perspective view of the forward end of the rocking lever that operates the wedge-pin to spread apart the stopper-expanding fingers. Fig. 3ᵇ is a detail sectional view illustrating the upper end of said wedge-pin and yielding support. Fig. 4 is a top plan view of the stoppering-machine. Fig. 5 is a detail side view of the wheel for raising the bottle-holder. Fig. 6 is a peripheral view thereof, showing the wrist-pin which holds the rod that connects said wheel with the bottle-holder. Fig. 7 is a detail side elevation of said wrist-pin with parts shown in section. Fig. 8 is a detail side elevation of the vertically-reciprocable stopper-holder which receives a stopper from the delivery-chute of the feed devices. Fig. 9 is a similar view thereof with its outer cylindrical casing shown in section. Fig. 10 is a bottom plan view of the same. Fig. 11 is a detail view illustrating the stopper-holder in section and with its casing removed and also showing the expanding-fingers and the means for automatically releasing the stopper from said holder. Fig. 12 is a detail side elevation of the expander. Fig. 13 is a detail view of the adjacent ends of the stopper-holder casing and delivery-chute. Fig. 14 is an elevation of the stopper-feed devices as they would be seen looking from the left toward the right of the machine, as shown in Fig. 1. Fig. 15 is an elevation of the same as viewed from the front of the machine. Fig. 16 is a detail sectional view of a portion of said stopper-feed devices. Fig. 17 is a similar view thereof with only one of the parts in section. Fig. 18 is a detail view of a portion of the stopper-delivery chute, illustrating the shunt device for discharging imperfect stoppers from said chute before they pass to the expanding devices. Fig. 19 is an elevation of the stopper-feed devices with a part thereof in section and illustrating the side opposite to that shown in Fig. 14. Fig. 20 is an elevation of the same, illustrating the side opposite to that shown in Fig. 15. Fig. 21 is a detail view of a portion of the delivery-chute, illustrating one side of the shunt device for imperfect stoppers. Fig. 22 is a vertical section of the same. Fig. 23, Sheet 1, illustrates two detail views of the ejector-finger for ejecting the stoppers out of the discharge end of the delivery-chute. Fig. 24, Sheet 1, is a sectional view of the upper portion of a bottle-neck with a stopper expanded therein and also a view of a stopper before it has been expanded.

We will first describe the general arrangement and operation of our bottle-stoppering machine and then specifically set forth the details of construction, pointing out the novel features and combinations of parts in the appended claims.

The machine is provided with a hollow vertical standard A, mounted upon a suitable base *a*. About midway of its height said standard is provided with a split yoke-clamp *a'*, in which the tubular stem *b* of a bottle-holder B is held so as to be vertically adjustable, and at its upper end said standard is provided with a forwardly-projecting ledge $a^2$, from which depend the stoppering devices C, the latter being at a suitable distance above and in vertical alinement with the said bottle-holder B.

The reference-letter D designates the feed device for positively feeding the stoppers one at a time and at the proper interval to the stoppering devices C and which is suitably clamped on one side of the forwardly-projecting ledge $a^2$.

The reference-letter E designates a continuously-rotating pulley loosely mounted on a horizontal shaft $e$. Said shaft is mounted in bearings $e'$ on the top of the standard A and is made fast with the said pulley E through the medium of a spring-actuated clutch $e^2$. A releasing device F is normally in engagement with said clutch and is operated from a foot-treadle $f$, fulcrumed at the base of the standard A. When the said treadle is depressed, the clutch $e^2$ engages the pulley, which causes the shaft $e$ to rotate. This rotation, through suitable means hereinafter described, causes the bottle-holder B to rise, so as to cause the mouth of a bottle placed thereon to be brought into position for action by the stoppering devices. A further rotation of said shaft depresses by means of a cam $g^5$ the rear arm $g$ of a rocking lever G, whose forward arm $g'$ raises a wedge-pin $c$, which has a wedge action on the inside of expanding-fingers $c'$, and said fingers expand the ductile metallic side walls of the stopper into an annular groove or underneath an annular shoulder in the neck of the bottle on the holder B. A still further rotation of the shaft $e$ permits the expanding-fingers to contract from the stopper and lowers the bottle-holder B and bottle away from the stoppering devices in position for the holder to receive another bottle.

*The bottle-holder.*—Secured at a predetermined vertical adjustment within the split clamp $a'$ on the front of the standard A, as shown in Figs. 1 and 2, is a vertical tubular stem $b$, open at both ends and provided at its top with a rigid cross-arm $b'$, as shown in Fig. 1. A sleeve $b^2$ is fitted to slide within said tube and is provided near its lower end with a rigidly-secured cross-arm $b^3$, in alinement with the said upper cross-arm $b'$. Vertical guide-rods $b^4$ slide through apertures in the ends of the cross-arms $b'$ and $b^3$, the lower ends of said rods being threaded and provided with nuts $b^5$, which act as stops to limit the upward movement of said rods, and a spring $b^6$ is coiled around each guide-rod between the said upper immovable cross-arm and the lower movable cross-arm, against which they bear to press the said guide-rods and sleeve $b^2$ downwardly. The upper ends of said guide-rods are rigidly connected together at their upper ends by a cross-head $b^7$, which is rigidly secured to the sleeve $b^2$, whereby to pull said sleeve downwardly as the rods move downwardly. The said sleeve is provided at its top with a threaded aperture, and the bottle-holding disk $b^8$ has a threaded rod $b^9$, which screws in said aperture, whereby the said disk may be raised and lowered with respect to the sleeve $b^2$. The upper face of the disk $b^8$ is preferably cushioned with a rubber pad $b^{10}$, and has a V-shaped guide $b^{11}$ in order to properly center the bottle.

The actuating mechanism J for raising the bottle-holder B so as to bring the mouth of the bottle H in proper relation to the stoppering devices is provided with a bushing $j$, fitting within the lower end of the vertically-slidable sleeve $b^2$ and having an exterior flange $j'$ engaging the lower end of said sleeve. A vertically-reciprocating rod $j^4$ is within the standard A and has at its lower end a lateral arm $j^2$, which projects through a vertical slot $a^3$ in the front of the standard, and the outer end of said arm is connected with the bushing $j$ by a pivot $j^3$. The upper end of said reciprocating rod $j^4$ has a longitudinally-extending slot $j^5$, which is adjustably attached to a wrist-pin $k$, which in turn is adjustably mounted in a diametrical undercut groove $k'$, formed on a wheel K, fixedly mounted on the horizontal shaft $e$. When said shaft turns, it is evident that the sleeve $b^2$ of the bottle-holder will be slid up and down in the tube $b$.

Figs. 1, 2, 5, 6, and 7 show the means for adjustably connecting the rod $j^4$ to the wheel K and for regulating the stroke of said rod. It will be seen that the wrist-pin $k$ is provided intermediate of its ends with a fixedly-secured or integral collar $k^2$. On one side of said collar said wrist-pin is threaded, as shown at $k^3$, and this threaded end is inserted through the slot $j^5$ in the rod $j^4$ and is secured at any desired point therein by a nut and washer $k^4$. Now when it is desired to make any change in the elevation of the bottle-holder B as a whole the tube $b$ is adjusted vertically in the split clamp $a'$, and the connecting-rod $j^4$ is then relatively adjusted on the wrist-pin $k$. On the other side of said collar $k^2$ the wrist-pin $k$ has an exteriorly-threaded sleeve $k^5$, on which a nut $k^6$ has previously been screwed. Said sleeve has an annular head $k^7$, which has position in the undercut groove $k'$, and a nut $k^8$ is screwed on the end of the wrist-pin $k$ and against the annular head to hold said sleeve thereon, as plainly indicated in Figs. 6 and 7. The stroke of the reciprocating rod $j^4$ is regulated by the distance the wrist-pin $k$ is from the axis of the wheel K, and when the wrist-pin has been adjusted the nut $k^6$ is screwed tightly against the outer face of said wheel to hold it. In order to permit the bottle-holder B to yield in case a bottle placed thereon is so long that its mouth would be crushed against the stoppering devices if the bottle-holder did not yield, we have in this instance made the vertically-reciprocating connecting-rod $j^4$ in two sections, as shown in Fig. 2, connected together at their adjacent ends by a helical spring $j^6$, and a roller $j^7$ guides the lower section of said rod up and down.

The operation of the bottle-holder B is as follows: After the operator has placed a bottle H in the V-shaped guide $b^{11}$ on the disk $b^8$ his foot depresses the treadle $f$, and thereupon the clutch $e^2$ will couple the shaft $e$ with the continuously-rotating pulley E. The rotation of such shaft turns the wheel K, which acts on the reciprocating rod $j^4$ and causes it to raise the movable parts of the bottle-holder so that the mouth of the bottle will be in proper position to receive a stopper. All slight vertical adjustment of the bottle-holding disk $b^8$ is effected by rotating said disk; but if any greater adjustment is required we prefer to move the tube $b$ up or down in the split clamp $a'$.

The clutch-releasing mechanism F, hereinbefore referred to, comprises specifically a rod $f^2$, which slides vertically in the bracket-arm which supports one of the shaft-bearings $e'$, and also through a horizontally-projecting bracket $a^5$ thereabove and whose upper end normally enters a cam-groove $e^3$ in the clutch member $e^2$, and a horizontal arm $f^4$, which is rigidly secured to the rod $f^2$, near the lower end of the latter, is also secured to the upper end of the vertical bar $f'$, located within the standard A. The lower end of said vertical bar $f'$ is pivoted to the treadle $f$, which latter is fulcrumed between ears $a^4$ on the standard A and projects out through the slot $a^3$ in the latter. A spring $f^5$ is coiled around the rod $f^2$ between the two bracket-arms just mentioned, so that when the treadle is released from a depressed position the spring will raise the rod and cause it to enter the cam-groove $e^3$ in the clutch member and move the latter out of engagement with the pulley E against the tension of the clutch-spring $e^4$.

*The stopper-expanding devices.*—The stopper-expanding devices C are located directly above the bottle-holder B and are provided with a tube $c^2$ of spring metal, secured vertically in and depending from the ledge $a^2$ of the standard A, as shown best in Fig. 3. The said tube is provided with a plurality of vertical slits $c^3$, extending to the lower end thereof, whereby to form a series of spring expanding-fingers $c'$, and each finger at its lower end is provided with upper and lower shoulders which together form two annular shoulders, designated $c^4$ and $c^5$, respectively, which are arranged to force the stopper to its seat in the bottle-mouth and compress and wedge the sealing-collar and also expand the ductile metal of the stopper-body into the annular groove in the bottle-mouth. A pin $c$, with a wedge-shaped head $c^{13}$, is mounted to reciprocate vertically within said expander-tube $c^2$ between the lower ends of the expanding-fingers. When this pin is raised, its head acts as a wedge against the lower ends of the expanding-fingers $c'$ and causes the latter to move outwardly to expand the stopper into the groove in the bottle-mouth. The mechanism for raising said pin $c$ comprises, as best shown in Figs. 2, 3, and 4, a two-armed rocking lever G, fulcrumed in a bearing $g^2$ on the top of the ledge $a^2$. One arm $g'$ of said lever extends forwardly over the ledge $a^2$ and is provided with an aperture $g^3$ at its outer end, through which the upper end of the wedge-pin $c$ extends. At each of two sides of said aperture is formed a shoulder $g^4$. A bushing $g^\times$ (see Fig. $3^b$) is loosely fitted on the upper end of the wedge-pin above the arm of the lever and is provided with a screw-threaded upper end. A collar $g^6$ is movably fitted on the bushing and is adapted to engage with shoulders $g^7$ on the lower end of said bushing and is provided with recessed lower edges $g^8$, which are supported to rock on the shoulders $g^4$, and a heavy coil-spring $g^9$ surrounds said bushing above said collar, the upper end of said spring bearing against nuts $g^{10}$, screwed on the upper ends of the bushing $g^\times$. A wedge-pin-adjusting nut $g^{11}$ is screwed on the upper end of the wedge-pin, as shown, and abuts against the upper end of the said bushing $g^\times$. By the arrangement described as the lever G rocks to raise the wedge-pin the nut or collar $g^6$ will rock on its two supporting-shoulders $g^4$, which will insure the true vertical movement of the wedge-pin, and in case of any deviation in the regular diametrical size of the mouth of the bottle to be sealed, after a certain amount of pressure has been exerted on the wedge-pin by the bottle on the holder, the heavy coil-spring $g^9$ will yield sufficiently to check the pressure of the wedge-shaped head on the expanding-fingers, thereby avoiding their expansion to too great an extent and preventing the fingers from breaking the bottle by excessive pressure on the stopper. The tension of the said spring may be regulated by the nuts $g^{10}$, and the nut $g^{11}$ on the upper end of the wedge-pin is provided in order to adjust said pin vertically with respect to the expanding-fingers. The other arm $g$ of the rocking lever G extends rearwardly into contact with the hub of the wheel K, as shown in Fig. 3, and is adapted to be depressed by a hard-metal cam $g^5$ on the adjacent face of said wheel, so that as the latter turns the said cam will rock the lever and raise the wedge-pin to expand the fingers. A hard-metal bearing-plate $g^{12}$ is detachably secured in any suitable manner to the rear lever-arm $g$, whereby to receive the pressure of the cam, and said cam is adjustably secured to the wheel K by slots and screws, as shown, whereby it may be adjusted so that it will be sure to act at the proper time.

*Stopper holding and releasing devices.*—In order to hold a stopper in position to go into the mouth of a bottle upon the rise of the bottle-holder B and to drop said stopper at the proper time into said bottle-mouth, we have provided the following parts, particular reference being had to Figs. 3, 8, 9, 10, and 11:

Rigidly secured around the expander-tube $c^2$, with its upper edge abutting against the under surface of the ledge $a^2$ of the standard A, is a stopper-releasing device in the form of a tube $l$, whose lower edge forms an annular shoulder $l'$, located a short distance above the lower end of the expanding-fingers, as shown in Fig. 11. Sliding vertically on said tube $l$ is a stopper-holding tube $l^2$, slitted at its lower end, whereby to form a series of spring-fingers $l^3$, which form an interior annular shoulder $l^4$, normally below the shoulders $l'$ of the releasing-tube $l$ and whose lower ends are provided with an inwardly-projecting annular flange $l^5$ for the upper rim of the stopper to rest on. An opening $l^6$, corresponding in contour to the cross-sectional shape of the stopper, is formed at one side and at the lower end of the spring-stopper holder, as shown in Fig. 9, through which the stopper passes from the feeding devices. Secured around the said stopper-holder $l^2$, so as to move vertically with it, is a cylindrical casing L, whose lower end is provided with an inwardly-projecting beveled flange $l^7$ below the lower ends of the stopper-holding fingers and adapted to guide the mouth of the bottle into position to receive the stopper. Two ears $l^8$ project out from opposite sides of said casing, vertical rods $l^9$ are secured in said ears and are also adjustably secured in the ledge $a^2$, whereby to suspend the vertically-movable casing L and stopper-holding tube $l^2$, and springs $l^{10}$ are coiled around said rods, whereby to normally hold said tube and casing in the down position. (Shown in Fig. 3.) The casing L is further provided with a stopper-shaped opening $l^{11}$ to admit the stoppers from the feed devices, and is also provided above said opening with a divided lug $l^{12}$ for a purpose presently described in connection with the feed devices.

In describing the operation of this part of the machine we will assume that a stopper has been passed into the stopper-holder $l^2$ and rests with its rim on the inwardly-projecting annular flange $l^5$ of the same. The bottle-holder now raises the bottle and the mouth of the latter abuts against the inward flange $l^7$ of the casing L and raises said casing and the stopper-holder, which movement causes the annular shoulder $l^4$ of the spring stopper-holder to ride upon the shoulder $l'$ of the releasing-tube $l$ just at the time the expanding-fingers are ready to enter the stopper, thereby spreading the spring-fingers $l^3$ apart and allowing the stopper to drop into the mouth of the bottle, which is just underneath and almost in contact with the stopper at that time. The bottle continues to rise until the stopper-expanding fingers $c'$ come into contact with the stopper, which fingers by resisting the upward movement force the stopper to its seat in the bottle-mouth, which compresses and wedges the sealing-collar, and thereupon the wedge-pin $c$ spreads the expanding-fingers apart, which expands the ductile metallic sides of the stopper into the groove in the mouth of the bottle. The bottle is then lowered, whereupon the springs $l^{10}$ press the casing L and stopper-holder $l^2$ downwardly, so that their side openings come into registry with the discharge end of the stopper-delivery chute in position to receive another stopper.

*The stopper-feeding devices.*—Referring to Fig. 1 and to Figs. 14 to 22, inclusive, D designates the device for holding a supply of stoppers and positively feeding one stopper at a time through the side openings of the casing L and stopper-holder $l^2$. A bracket $d$ is clamped to the right-hand side of the standard-ledge $a^2$, and to its upper end is secured an approximately circular flat plate $d'$. A horizontal rotary shaft $d^2$ is mounted in suitable bearing-brackets $d^x$ $d^y$ and extends through said plate and derives its motion from the pulley E by means of a grooved pulley $d^3$, connected by a belt $d^4$ with the movable member of the clutch—that is, the hub of said pulley E. The said shaft $d^2$ at one end carries a stopper-receptacle D' in the form of a truncated cone having a removable end cap $d^5$, which is taken off to insert a quantity of stoppers into the receptacle, and the latter is provided at its circular rim with outlet-openings $d^6$, which are "stopper-shaped"—that is, are of a contour corresponding to the cross-section of the stoppers used. Said openings are so positioned that a stopper can only pass therethrough into the delivery-chute $d^7$ when the stopper is right side up, and the said chute curves toward the expanding devices and terminates at the casing L. The rotary receptacle D' is provided on its interior, as shown in Fig. 19, with diagonal or spiral ribs $x$, against which the stoppers strike as the receptacle turns, thus causing them to tumble. The chute $d^7$ is provided at its upper end with a ring $d^8$, which entirely encircles and is spaced from the stopper-receptacle D' around the openings. The space or channel $d^9$ in said ring for about one-third its length, as shown by dotted line in Fig. 19, is as wide as a stopper and the remaining two-thirds of said channel are less than the width of a stopper. Now when the stoppers pass out of the receptacle into the wide part of said channel should the chute $d^7$ and said wide part of the channel become filled no more stoppers can come completely out of the receptacle; but when a stopper comes, say, half-way out of one of the openings $d^6$ it can come no farther, but will be kept rolling around in the narrow part of the channel and over the stoppers in the filled wide part of the same until room is made for it by the ejecting of a stopper out of the delivery end of the chute $d^7$, at which time the said stopper carried around half-way out of the opening $d^6$ can come entirely out of said opening. At the circular rim of the receptacle is also provided a channel $d^{14}$, (see Fig. 15,) into which the stoppers fall to go out of the stopper-openings $d^6$, so that the stoppers will fall and roll edgewise, and should a stopper come half-way out of an opening, as just described, and in a wrong-side-up position it will be thrown back into the receptacle by means of a number of pins or lugs $d^{15}$, which extend across said channel $d^{14}$. One of these pins is shown in Fig. 15. A hanger $o$ is secured at one side of the upper end of the delivery-chute $d^7$. A rod O reciprocates vertically through said hanger and is prevented from rotating by means of a pin $o^2$, working in a slot $o^3$ in the hanger, and a roller $o^4$ is journaled in the upper end of said rod and rides upon a cam $n$ on a horizontal shaft N, which latter is geared with the main horizontal shaft $e$ by means of sprocket-gearing $n'$. A spring $o^6$ is coiled around the rod O and bears against the hanger $o$ and pin $o^2$, whereby to press said rod upwardly, so that its roller $o^4$ will always be in contact with the cam $n$. The lower end of the rod O is tubular, as shown in Figs. 16 and 17. Inside of its tubular portion is rigidly secured a sleeve $o^7$, and inside of said sleeve is slidably fitted a shank P, which is pressed downwardly by a spring $o^9$ inside said sleeve, whereby said shank is permitted to yield in an upward direction. To the lower end of this shank is pivotally secured one leg $p$ of a stopper-pusher, as shown best in Figs. 15 and 18, and the other leg $p'$ is pivotally secured to the first-named leg, as shown at $p^2$. The said legs are both pressed upon by a spring $p^3$, so that their free ends project into the longitudinal slot $d^{10}$ in the adjacent side of the delivery-chute $d^7$, and a roller $p^4$ is journaled on each leg and bears on the chute to prevent the free ends of the legs from entering too far into the chute. A spring-pressed abutment Q is secured to the chute near said stopper-pusher and is provided with a finger $q$, formed with a beveled forward end which normally extends across the slot $d^{10}$, and said finger is adjusted to extend more or less across said slot by a nut $q'$, screwed on its rear end and bearing against the rear end of its casing $q^2$, which latter is secured to a bracket $q^3$, vertically adjustable on the chute. On their downward movement the legs of the stopper-pusher will engage two contiguous stoppers in the chute $d^7$ and push them over or out of a shunt device R, presently described, and the said legs engage with the beveled end of the abutment-finger and press said finger back. On the backward or upward movement said legs will ride up over said abutment-finger, which latter disengages said legs from the stoppers. The stoppers that pass over the shunt device pass down to the discharge end of the chute $d^7$, where they are caught and held by leaf-springs $d^{12}$, whose free ends pass through two opposite sides of the chute, and the stoppers are positively forced one at a time between said springs and into the stopper-holder by means of ejecting mechanism, which we will now describe.

The reference-letter $s$ designates a short tube (see particularly Figs. 15, 16, and 17) which is movably fitted around the sleeve $o^7$ and inside the tubular lower end of the rod O and is held from detachment from said sleeve by a nut $s'$, screwed on the lower end of the latter, and $s^2$ designates a coil-spring which bears downwardly on said short tube $s$ and whose tension may be adjusted by the nut $s'$. By this arrangement the said tube may yield when necessary. Tightly clamped around the tube $s$ is a collar $s^3$, to which is pivotally secured the depending arm $s^4$ for actuating the ejector, and which collar is provided with a pin $s^x$, which slides in a slotted plate $s^y$. A face-plate S is rigidly secured to the chute $d^7$ at about the middle thereof. The rear section $t$ of an ejector-arm T is pivotally connected at one end to said face-plate by a stud $t'$. The forward section $t^2$ of said arm is pivoted to the other end of the rear section, and an ejector-finger $t^3$ is pivotally connected to the free end of said forward section $t^2$ and is offset, as shown at $t^4$, the free end of said finger entering the slot $d^{10}$ of the delivery-chute and provided with upper and lower teeth $t^x$ $t^y$, adapted to take secure hold of the soft metal of the stopper-body and eject the stopper in proper upright position. A compression-spring $s^5$ has one end secured to the actuating-arm $s^4$ and has its other end secured to the chute $d^7$, whereby it has a tendency to draw said arm toward the chute. Another spring $t^5$ is secured at one end to the stud $t'$, as shown in Fig. 20, and is coiled around the pivot $t^6$, which connects the two sections of the ejector-arm with its other end secured to a pin $t^7$ on said forward section, whereby to draw the rear section thereof rearwardly and the forward section thereof toward the chute, and another smaller spring $t^8$ is secured to a small pin $t^9$ on the pivoted ejector-finger $t^3$ and is also secured to the free end of the forward ejector-arm section $t^2$, whereby to yieldingly hold said finger always in the slot $d^{10}$ in contact with the stoppers. The said pin $t^9$ engages the upper edge of its forward section $t^2$ and prevents the ejecting-finger from going too far into the slot, and a roller $t^{10}$ is journaled on the free end of the said forward section $t^2$ and rolls on the chute to maintain the proper relation of said arm-section to said chute. As shown in Fig. 15, the ejector-actuating arm $s^4$ is provided with a shoulder $s^6$ and a curved end $s^7$ beyond said shoulder, and the rear section $t$ of the ejector-arm T is provided with a lug $t^{11}$, adapted to be engaged by said shoulder $s^6$, whereby to swing said arm T when the actuating-arm $s^4$ is moved down by the downward movement of the rod O. As said actuating-arm moves down its curved end $s^7$ rides upon a roller trip-pin $s^8$, adjustably held in a slot $s^9$ in the face-plate S, which trip-pin finally throws the actuating-arm out of engagement with the lug $t^{11}$ when the stopper has been carried far enough into the stopper-holder and allows the spring $t^5$ to jerk back the ejector-arm. By adjusting said trip-pin in its slot it is evident that the actuating-arm may be tripped more or less quickly and the swing movement of the ejector-arm T shortened or lengthened.

The specific form of ductile metallic stoppers which we prefer to use in connection with our machine, although manifestly other forms may be used, is shown in Figs. 18 and 24. The metal body $h$ of the stopper is substantially cup-shaped and provided with an outwardly-extending top rim $h'$, and around the cup-shaped body is a cork sealing-collar $h^2$, which is clenched under said top rim and which seals the joint between the stopper and bottle-mouth. These cork sealing-collars sometimes become detached from the cup part, and in order to prevent an imperfect stopper that is without its sealing-collar from passing to the stoppering devices we have provided a delivery-chute which extends straight down from the stopper-receptacle for about half of its length and then curves toward the stopper-expanding devices, and at the point where the curve commences we have located shunt devices R for discharging collarless stoppers at that point. These shunt devices comprise, as shown in Figs. 18, 21, and 22, two pass-rails $r$, secured on the interior of the chute, one at each side of the slot $d^{10}$ of the chute at a point within the line of travel of the two legs $p$ $p'$ of the stopper-pusher, and a downwardly-discharging shunt-opening $r'$, commencing a little above the said pass-rails, and on each side of which opening is a downwardly-extending discharge-rail $r^2$. The width of the shunt-opening $r'$ is a little less than the diameter of a stopper with a sealing-collar on and somewhat greater than the diameter of a stopper without a collar. Therefore it is evident that as the stoppers are pushed down the chute by the pusher-legs $p$ $p'$ those stoppers that are without sealing-collars will be pushed through the shunt-opening $r'$, while the stoppers with collars will ride with their rims $h'$ on the pass-rails $r$, which will deflect them from the shunt-opening and pass them safely over the same. In order to prevent the rim of an imperfect stopper from catching on the rim of a good stopper just in advance of it and be carried by said good stopper onto the pass-rails, we have provided the two-legged stopper-pusher hereinbefore described, which always holds the two adjacent stoppers slightly separated from each other when it pushes them past or into the shunt devices.

The operation of the stopper-feeding devices is as follows: The stopper-receptacle is kept in continuous rotation and feeds stoppers into the chute $d^7$. When the main shaft $e$ rotates, the shaft N also rotates, and its cam $n$ will depress the rod O, which will move the two-legged stopper-pusher and the ejector-actuating arm $s^4$ downward, as before described, and said arm will swing the ejector-arm T downwardly, causing it to eject a stopper out of the discharge end of the chute and carry it into the casing L and stopper-holder $l^2$. The trip-pin $s^8$ will throw the actuating-arm out of engagement with the ejector-arm T as soon as the latter has thus ejected a stopper, and the ejector will then be brought back with a quick jerk by its springs into engagement with another stopper. The ejector-arm jerks back before the cam $n$ turns far enough to allow the pusher-legs to move backwardly, so that the stoppers are held by said pusher-legs until the ejector gets hold of another stopper. Then for the next bottle to be sealed the cam allows both actuating-arm $s^4$ and pusher-legs to move backward, so that the said arm $s^4$ will again engage with the ejector-arm and the pusher-legs will engage more stoppers. If the attendant of the machine should by oversight let a stopper remain in the holder and then allow the stopper-ejector and stopper-pusher to operate again, no harm will be done to the machine or to the stoppers, because both the ejector and the pusher will yield on account of the arrangement of spring-pressed tubes which carry said parts, as hereinbefore described and shown particularly in Figs. 16 and 17, and in case such contingency happens a stopper will be carried by the ejector-finger into, but not through, the side opening of the casing L, where it will remain until removed by hand. To meet this emergency, we have formed the upper wall of the discharge end of the stopper-delivery chute $d^7$ with a semicircular recess $l^{13}$, as shown in Fig. 14, in which normally fits the divided lug $l^{12}$ of the casing L, hereinbefore described in connection with the stopper-holding devices, said lug normally closing said recess as far as possible, so as to keep out dirt and dust. (See Fig. 13.) When a stopper has been caught in the side opening of the casing L, the attendant can readily raise the said casing by hand, so as to clear the chute and then remove the said stopper.

In order that the attendant may ascertain at once if no stopper has been ejected out of the delivery-chute, we have provided an alarm mechanism U, arranged to be actuated by one of the springs $d^{12}$ at the discharge end of said chute, as best seen in Figs. 14, 15, 19, and 20. Mounted on a small bracket $u$, at one side of the lower end of the chute, is a rod $u'$, which is adapted to rock in an approximately horizontal plane, and the forward end of said rod extends into contact with the free end of the adjacent spring at the discharge end of the chute. A carrier-plate $u^2$ is pivoted to swing in a vertical plane at one side of said chute above said rod, and said plate is provided with ears $u^3$, in which a rod $u^4$ is mounted to partially turn about its longitudinal axis, and the upper end of said rod carries a clapper $u^5$, adapted to strike a gong $u^6$, secured to the face-plate S. In the lower end of said partially-rotatable rod $u^4$ is secured a pin $u^7$, so that said pin is mounted to rock. One end of said pin extends across underneath the rear end of the rocking rod $u'$, and the other end of said pin normally extends in the way of an alarm-trip $u^8$, pivoted on the forward section $t^2$ of the ejector-arm T, as shown in Fig. 20. If there is a stopper in the lower end of the chute $d^7$ when the ejector-arm moves downwardly, said stopper will push apart the springs $d^{12}$, and one of the latter, as is evident, will rock the rod $u'$, which will in turn throw the pin $u^7$ out of the way of the alarm-trip $u^8$, so that the alarm will not be sounded; but if the supply of stoppers has become exhausted and no stopper is ejected by the downward movement of the ejector-arm the alarm-trip $u^8$ will engage the pin $u^7$ and cause the alarm to sound.

In the description of the general operation of our machine we will consider that a stopper has already been deposited by the feed devices D into the stopper-holder $l^2$ and that the bottle-holder B is at the lowermost limit of its movement. The operator places a bottle H on the bottle-holding disk and depresses the treadle with his foot, thereupon causing the main shaft $e$ to turn with the pulley E, which will turn the wheel K, so as to pull the reciprocating rod $j^4$ upwardly, and the latter will raise the bottle-holder B. When the bottle-holder rises with a bottle on it, its upward movement will raise the casing L and stopper-holder $l^2$ and the latter will automatically drop the stopper into the bottle-mouth. The continued upward movement of the bottle will force the stopper to its seat and cause a wedging and compressing of the cork-sealing collar when the latter contacts with the expanding-fingers. The expanding-fingers are then spread by the wedge-pin $c$, and thereby the ductile metallic sides of the stopper are forced into the annular groove in the bottle-mouth. The further rotation of the shaft $e$ will have the effect of allowing the expanding-fingers to contract and free themselves from the expanded stopper, and immediately the bottle-holder will commence to descend. The casing L and stopper-holder $l^2$ will also commence to descend, and the cam $n$ on the shaft N is so timed that it will actuate the stopper-pusher and stopper-ejector to eject a stopper from the delivery-chute $d^7$ just as soon as the side openings of the said casing and stopper-holder have come into registry with the discharge-mouth of the delivery-chute.

While the accompanying drawings show one form of our invention, it is evident that changes in the details of construction and arrangement of the parts may be made without departing from the scope of the invention, which is defined in the appended claims.

Having thus described our invention, what we claim as new, and desire to secure by Letters Patent, is—

1. In a bottle-stoppering machine, the combination of a bottle-holder; stopper-expanding fingers thereabove; a vertically-reciprocable stopper-holder surrounding said expanding-fingers; a casing surrounding and secured to said stopper-holder and spring-pressed in a downward direction; and means whereby the mouth of a bottle on said bottle-holder will press against said casing and raise the latter and said stopper-holder against the action of said casing-springs, for the purpose set forth.

2. In a bottle-stoppering machine, stopper-expanding devices; a vertically-reciprocable stopper-holder adapted to hold a stopper below said expanding devices; and a downwardly-spring-pressed bottle-mouth guide secured to said stopper-holder, the bottle-mouth guide and stopper-holder being distinct parts, for the purpose set forth.

3. In a bottle-stoppering machine, the combination of stopper-expanding fingers; means for spreading said fingers apart; a vertically-reciprocable stopper-holding tube slitted at its lower end whereby to form spring-fingers adapted to hold a stopper below the stopper-expanding fingers; and means for automatically spreading said stopper-holding fingers apart whereby to release the stopper therefrom.

4. In a bottle-stoppering machine, the combination of stopper-expanding fingers; means for spreading said fingers apart; a vertically-reciprocable stopper-holder adapted to hold a stopper below said expanding-fingers; a casing surrounding and secured to said stopper-holder to raise the latter and serving as a bottle-mouth guide, said casing being a part distinct from said stopper-holder; and a device for automatically releasing the stopper when the stopper-holder is raised.

5. In a bottle-stoppering machine, the combination of a stopper-expander provided with expanding-fingers; means for spreading said fingers apart; a stopper-releasing device surrounding said expander and provided with an annular shoulder; and a series of stopper-holding fingers slidable on said releasing device and provided with shoulders adapted to engage the shoulder of the same whereby to spread the stopper-holding fingers apart.

6. In a bottle-stoppering machine, the combination of a tube provided with a series of spring expanding-fingers; means for spreading said fingers apart; a releasing-tube surrounding said expanding-fingers and provided at its lower end with an annular shoulder; a stopper-holding tube slidable vertically on said releasing-tube and provided with a series of spring-fingers which engage said shoulder when said stopper-holding tube is raised; and a cylindrical casing secured around said stopper-holding tube.

7. In a bottle-stoppering machine, a stopper holding, releasing, and expanding device, comprising a series of expanding-fingers; a wedge-pin adapted to spread said fingers apart; a tube surrounding said fingers; and a series of stopper-holding fingers on said tube and adapted to be spread apart by said tube whereby to release the stopper, the stopper-holding fingers at their lower end being provided with an inwardly-projecting flange on which the rim of the stopper is adapted to rest until the stopper is released.

8. In a bottle-stoppering machine, the combination with a standard, of a vertically-reciprocable bottle-holder mounted thereon; stopper-expanding devices also mounted thereon above said bottle-holder; a rotatable shaft journaled on said standard and provided with a wheel, K; and a reciprocating and vertically-yielding rod secured to said wheel and also to said bottle-holder whereby to move the latter up and down.

9. In a bottle-stoppering machine, the combination with a standard, of stopper-expanding devices mounted on said standard and provided with expanding-fingers and a wedge-pin adapted to spread said fingers apart; a rocking lever fulcrumed on said standard and provided with an arm which has an aperture which receives said wedge-pin and a shoulder at each side of said aperture; an upwardly-yielding collar inserted on said wedge-pin and provided with recesses at its lower end which loosely fit over said shoulders; and means for rocking said lever.

10. In a bottle-stoppering machine, the combination with a standard, of stopper-expanding devices mounted on said standard and provided with expanding-fingers and a wedge-pin adapted to spread said fingers apart; a rocking lever fulcrumed on said standard and provided with an arm through which the upper end of said wedge-pin is loosely inserted; a bushing sliding on the upper end of said wedge-pin above said lever-arm and provided with an encircling spring; a collar on the lower end of said bushing and abutting against the said spring and resting on said lever-arm; means for limiting the upward sliding movement of said bushing on said wedge-pin; and means for rocking said lever.

11. In a bottle-stoppering machine, the combination with a stopper-holder, of a delivery-chute whose discharge end is located adjacent said holder; a stopper-receptacle adapted to pass stoppers into said chute; a reciprocating ejector-arm engaging the stoppers one at a time on its forward movement and ejecting them from the end of the chute into the stopper-holder; and a stopper-pusher adapted to move forward simultaneously with said ejector-arm whereby to push the stoppers down the chute, said pusher remaining still and holding the stoppers from moving up the chute on the backward movement of the ejector-arm, until the latter engages with another stopper.

12. In a bottle-stoppering machine, the combination with a stopper-holder, of a delivery-chute whose discharge end is located adjacent said holder; a stopper-receptacle adapted to pass stoppers into said chute; a reciprocating ejector-arm which on its forward movement ejects the stoppers from the end of the chute into the stopper-holder; and means for engaging and holding said stoppers in the discharge end of the chute from moving up the chute during the backward movement of the ejector-arm.

13. In a bottle-stoppering machine, the combination with a stopper-holder, of a delivery-chute whose discharge end is adjacent said holder; a stopper-receptacle adapted to pass stoppers into said chute; a reciprocating ejector-arm which ejects the stoppers from the end of the chute into the stopper-holder; a shunt device for discharging collarless stoppers from said chute at a point above the said end of the same; and a reciprocating pusher-foot arranged to engage and push the stoppers past or out of said shunt device.

14. In a bottle-stoppering machine, the combination with a stopper-holder; of a delivery-chute whose discharge end is adjacent said holder; a stopper-receptacle adapted to pass stoppers into said chute; a reciprocating ejector-arm which ejects the stoppers from the end of the chute into the stopper-holder; a shunt device for discharging collarless stoppers from said chute at a point above the said end of the same; and a reciprocating stopper-pusher provided with two legs adapted to engage two adjacent stoppers in said chute and push them past or out of said shunt device.

15. A stopper-feed device for bottle-stoppering machines, comprising a stopper-receptacle; a delivery-chute adapted to receive stoppers from said receptacle; a reciprocating ejector-arm adapted to eject the stoppers out of the discharge end of said chute; means for swinging said arm forwardly; a trip for releasing said arm from said swinging means; and means for jerking said arm backwardly when the latter is released.

16. A stopper-feed device for bottle-stoppering machines, comprising a stopper-receptacle; a delivery-chute adapted to receive stoppers from said receptacle and provided with a face-plate; an ejector-arm pivotally connected to said face-plate; a vertically-reciprocating actuating-arm arranged for engagement with said ejector-arm; a trip-stud secured to said face-plate and adapted to release said actuating-arm from said ejector-arm; and a spring for jerking said latter arm backwardly.

17. A stopper-feed device for bottle-stoppering machines, comprising a stopper-receptacle; a delivery-chute adapted to receive stoppers from said receptacle; an ejector-arm for ejecting the stoppers from said chute; an actuating-arm $s^4$ for moving said ejector-arm forwardly; a rod, O, for moving said actuating-arm; and a yielding connection between said rod and actuating-arm.

18. A stopper-feed device for bottle-stoppering machines, comprising a stopper-receptacle; a delivery-chute adapted to receive stoppers from said receptacle; a vertically-reciprocating ejector-arm adapted to eject the stoppers from said chute; an actuating-arm for moving said ejector-arm forwardly; and means whereby said arm may yield.

19. A stopper-feed device for bottle-stoppering machines, comprising a stopper-receptacle; a delivery-chute adapted to receive stoppers from said receptacle; an ejector-arm for ejecting stoppers from said chute; an actuating-arm adapted to engage said ejector-arm and move it forwardly; an adjustable trip for throwing said actuating-arm out of engagement with said ejector-arm; and means for moving said ejector-arm backwardly.

20. A stopper-feed device for bottle-stoppering machines, comprising a stopper-receptacle; a delivery-chute adapted to receive stoppers from said receptacle; a rod, O, mounted to vertically reciprocate adjacent said chute, and provided with a tubular lower end; a downwardly-spring-pressed shank slidable in said tubular lower end; a stopper-pusher pivotally connected to said shank; a downwardly-spring-pressed tube also slidable in the lower end of said rod; an ejector-actuating arm pivotally connected to said tube; and a stopper-ejecting arm arranged for engagement by said actuating-arm.

21. A stopper-feed device for bottle-stoppering machines, comprising a rotary stopper-receptacle provided at its rim with a channel, $d^{14}$, and stopper-outlet openings, $d^6$; a stationary ring, $d^8$, entirely encircling said rim and also, provided with a channel, $d^9$; and a delivery-chute, $d^7$, adapted to receive the stoppers passed from the channel, $d^{14}$, through the openings, $d^6$, into the channel, $d^9$, as and for the purpose set forth.

22. In a bottle-stoppering machine, the combination of intermittently-operated stopper-expanding devices; a continuously-rotated stopper-receptacle; a delivery-chute adapted to pass the stoppers from said stopper-receptacle to the expanding devices; and an intermittently-operated ejector-arm adapted to carry the stoppers one at a time from said chute to the expanding devices.

23. A stopper-feed device for bottle-stoppering machines, comprising a stopper-receptacle; a delivery-chute adapted to receive stoppers from said receptacle; an ejector-arm adapted to engage a stopper and carry it out of the discharge end of the delivery-chute; and an alarm device sounded by said arm when the latter passes out of the discharge end of the chute without a stopper.

24. A stopper-feed device for bottle-stoppering machines, comprising a stopper-receptacle; a delivery-chute adapted to receive stoppers from said receptacle; an ejector-arm adapted to engage the stopper in said chute and carry it out of the discharge end of the delivery-chute; an alarm device actuated by said arm when the latter moves forwardly without engaging a stopper; and means for throwing said alarm device out of the way of said arm when the latter, on its forward movement, engages a stopper.

25. A stopper-feed device for bottle-stoppering machines, comprising a stopper-receptacle; a delivery-chute adapted to receive stoppers from said receptacle; an ejector-arm adapted to engage a stopper and carry it out of the discharge end of the delivery-chute; a spring at the discharge end of the chute and extending into the way of the stopper; an alarm device arranged to be actuated by said ejector-arm; and means for throwing said alarm device out of the way of said ejector-arm when said spring is pressed upon by a stopper.

26. A stopper-feed device for bottle-stoppering machines, comprising a stopper-receptacle; a delivery-chute adapted to receive stoppers from said receptacle; an ejector-arm adapted to engage a stopper to eject it out of the discharge end of the delivery-chute; a gong secured to said chute; a pivoted clapper also secured to said chute; an alarm-trip carried by said ejector-arm and adapted to trip said clapper; and means for throwing said clapper out of the way of said alarm-trip.

27. A stopper-feed device for bottle-stoppering machines, comprising a stopper-receptacle; a delivery-chute adapted to receive stoppers from said receptacle; an ejector-arm adapted to eject stoppers out of the discharge end of the delivery-chute; a gong secured to said chute; a pivoted and partially-rotatable rod mounted on said chute, and provided at one end with a clapper adapted to strike said gong, and also provided at its other end with a pin which rocks when said rod rotates; an alarm-trip mounted upon an ejector-arm and adapted to strike said pin to trip said rod; a rocking rod, $u'$, adapted to engage said rocking pin and move the latter out of the way of said alarm-trip; and means whereby a stopper in said chute will rock said rod, $u'$, as and for the purpose set forth.

28. In a bottle-stoppering machine, the combination of stopper-expanding fingers; means for spreading said fingers apart; a bottle-mouth guide surrounding said expanding-fingers and provided with a side opening for the passage of a stopper; a stopper-delivery chute with its discharge end normally adjacent said side opening and provided with a recessed upper wall; and a divided lug, $l^{12}$, secured to the bottle-mouth guide above said side opening and normally fitting in said recess.

29. In a bottle-stoppering machine, the combination with stopper-expanding devices of stopper-feeding devices comprising a horizontal rotary shaft, $d^2$; means for rotating said shaft; a rotary conical stopper-receptacle carried by said shaft and provided at its rim with a channel, $d^{14}$; and a discharge-chute adapted to pass stoppers from said receptacle to said expanding devices.

In testimony whereof we affix our signatures in the presence of two witnesses.

JOSEPH BUTKUS.
JOHN A. BUTKUS.

Witnesses:
F. S. STITT,
CHARLES L. VIETSCH.